(12) United States Patent
Hayashi et al.

(10) Patent No.: US 8,981,717 B2
(45) Date of Patent: Mar. 17, 2015

(54) ELECTRIC VEHICLE CHARGE CONTROL SYSTEM

(75) Inventors: Masanori Hayashi, Wako (JP); Koichiro Takemasa, Wako (JP); Taisuke Tsurutani, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 523 days.

(21) Appl. No.: 13/437,231

(22) Filed: Apr. 2, 2012

(65) Prior Publication Data

US 2012/0256588 A1 Oct. 11, 2012

(30) Foreign Application Priority Data

Apr. 7, 2011 (JP) ................................. 2011-085801
Mar. 15, 2012 (JP) ................................. 2012-058916

(51) Int. Cl.
*H02J 7/00* (2006.01)
*B60L 11/18* (2006.01)
*B60L 3/12* (2006.01)

(52) U.S. Cl.
CPC ............... *B60L 11/1816* (2013.01); *B60L 3/12* (2013.01); *H02J 7/0004* (2013.01); *H02J 7/0073* (2013.01); *Y02T 10/7088* (2013.01); *Y02T 10/7005* (2013.01); *Y02T 90/121* (2013.01); *Y02T 90/14* (2013.01)
USPC .......... 320/109; 320/104; 320/139; 180/65.1; 180/65.21

(58) Field of Classification Search
CPC ..................................................... Y02T 90/14

USPC .......................................................... 320/109
See application file for complete search history.

(56) References Cited

U.S. PATENT DOCUMENTS

| | | | |
|---|---|---|---|
| 2002/0060551 A1* | 5/2002 | Ikeda ............................. | 320/104 |
| 2004/0051500 A1* | 3/2004 | Kuroda et al. ................. | 320/104 |
| 2005/0035743 A1* | 2/2005 | Kawakami et al. ............ | 320/162 |
| 2009/0062967 A1* | 3/2009 | Kressner et al. .............. | 700/286 |

FOREIGN PATENT DOCUMENTS

| | | |
|---|---|---|
| JP | 08-240435 A | 9/1996 |
| JP | 2003-294463 A | 10/2003 |
| JP | 2009-089756 A | 4/2009 |

* cited by examiner

*Primary Examiner* — Yalkew Fantu
(74) *Attorney, Agent, or Firm* — Westerman, Hattori, Daniels & Adrian, LLP

(57) ABSTRACT

The usage pattern of an electric vehicle including the amount of power consumption of a battery on each day of the week is extracted from usage histories of the vehicle in a predetermined period. When the vehicle goes home after one day's operation and is connected to a charging apparatus, a charge determination unit predicts a usage pattern of the vehicle on the next day and determines whether the vehicle can operate on the next day with the remaining amount of power of a battery in the vehicle. When it is determined that the charging of the battery is necessary, the battery is charged until it reaches the target remaining amount of power. The target remaining amount of power is determined on the basis of the amount of power consumption in the predicted usage pattern so that the full charge is prevented and the number of charges is reduced.

9 Claims, 9 Drawing Sheets

| DRIVER | DAY | ROUTE | SOC BEFORE OPERATION | SOC AFTER OPERATION | CHARGE | SETTING OF CHARGER FOR A'S USE | SETTING OF CHARGER FOR B'S USE | TRANSMISSION TO A (PHONEMAIL) | TRANSMISSION TO B (PHONEMAIL) | MANNER, etc. |
|---|---|---|---|---|---|---|---|---|---|---|
| A | MONDAY | OUTWARD ROUTE FOR COMMUTING | 100 | 90 | ○ | — | — | — | — | — |
| A | MONDAY | RETURN ROUTE FOR COMMUTING | 90 | 80 | — | — | — | — | — | — |
| A | TUESDAY | OUTWARD ROUTE FOR COMMUTING | 80 | 70 | — | — | — | — | — | — |
| A | TUESDAY | RETURN ROUTE FOR COMMUTING | 70 | 60 | — | — | — | — | — | — |
| B | WEDNESDAY | OUTWARD ROUTE FOR MEAL | 100 | 80 | ○ | — | — | — | — | — |
| B | WEDNESDAY | RETURN ROUTE FOR MEAL | 80 | 60 | — | — | — | — | — | — |
| A | THURSDAY | OUTWARD ROUTE FOR COMMUTING | 100 | 90 | ○ | — | — | — | — | — |
| A | THURSDAY | RETURN ROUTE FOR COMMUTING | 90 | 80 | — | — | — | — | — | — |
| A | FRIDAY | OUTWARD ROUTE FOR COMMUTING | 80 | 70 | — | — | — | — | — | — |
| A | FRIDAY | RETURN ROUTE FOR COMMUTING | 70 | 60 | — | — | — | — | — | — |
| B | SATURDAY | OUTWARD ROUTE FOR SHOPPING | 100 | 90 | ○ | — | — | — | — | — |
| B | SATURDAY | RETURN ROUTE FOR SHOPPING | 90 | 80 | — | — | — | — | — | — |
| — | SUNDAY | UNUSED | — | — | — | — | — | — | — | — |

| DRIVER | DAY | ROUTE | SOC | | CHARGE | SETTING OF CHARGER FOR A's USE | SETTING OF CHARGER FOR B's USE | TRANSMISSION OF CHARGE REQUEST (PHONEMAIL, MAIL/MEMBER, etc.) | | |
|---|---|---|---|---|---|---|---|---|---|---|
| | | | BEFORE OPERATION | AFTER OPERATION | | | | TRANSMISSION TO A (PHONEMAIL) | TRANSMISSION TO B (PHONEMAIL) | MAIL/MEMBER, etc. |
| A | MONDAY | OUTWARD ROUTE FOR COMMUTING | 80 | 70 | — | 70 | 90 | — | — | — |
| A | MONDAY | RETURN ROUTE FOR COMMUTING | 70 | 60 | — | 70 | 90 | — | — | — |
| A | TUESDAY | OUTWARD ROUTE FOR COMMUTING | 60 | 50 | — | 70 | 90 | — | — | — |
| A | TUESDAY | RETURN ROUTE FOR COMMUTING | 50 | 40 | — | 70 | 90 | ○ | ○ | ○ |
| B | WEDNESDAY | OUTWARD ROUTE FOR MEAL | 90(80) | 70(60) | ○ | 70 | 90(80) | — | — | — |
| B | WEDNESDAY | RETURN ROUTE FOR MEAL | 70(60) | 50(40) | — | 70 | 90(80) | — | — | — |
| A | THURSDAY | OUTWARD ROUTE FOR COMMUTING | 50(40) | 40(30) | — | 70 | 90(80) | — | ○ | — |
| A | THURSDAY | RETURN ROUTE FOR COMMUTING | 40(30) | 30(20) | ○ | 70 | 90(80) | — | — | ○ |
| A | FRIDAY | OUTWARD ROUTE FOR COMMUTING | 70 | 60 | — | 70 | 80 | — | — | — |
| A | FRIDAY | RETURN ROUTE FOR COMMUTING | 60 | 50 | — | 70 | 80 | — | — | — |
| B | SATURDAY | OUTWARD ROUTE FOR SHOPPING | 50 | 40 | — | 70 | 80 | — | — | — |
| B | SATURDAY | RETURN ROUTE FOR SHOPPING | 40 | 30 | — | 70 | 80 | — | — | — |
| — | SUNDAY | UNUSED | — | — | — | 70 | 80 | — | — | — |

FIG. 5A

| DRIVER | DAY | ROUTE | SOC | | CHARGE | SETTING OF CHARGER FOR A's USE | SETTING OF CHARGER FOR B's USE | TRANSMISSION OF CHARGE REQUEST (PHONE/EMAIL/NAVI/WEB, etc.) | | |
| | | | BEFORE OPERATION | AFTER OPERATION | | | | TRANSMISSION TO A (PHONE/EMAIL) | TRANSMISSION TO B (PHONE/EMAIL) | NAVI/WEB, etc. |
| --- | --- | --- | --- | --- | --- | --- | --- | --- | --- | --- |
| A | MONDAY | OUTWARD ROUTE FOR COMMUTING | 70 | 60 | ○ | 70 | 80 | — | — | — |
| A | MONDAY | RETURN ROUTE FOR COMMUTING | 60 | 50 | — | 70 | 80 | — | — | — |
| A | TUESDAY | OUTWARD ROUTE FOR COMMUTING | 50 | 40 | — | 70 | 80 | — | — | — |
| A | TUESDAY | RETURN ROUTE FOR COMMUTING | 40 | 30 | — | 70 | 80 | — | ○ | ○ |
| B | WEDNESDAY | OUTWARD ROUTE FOR MEAL | 80 | 70 | ○ | 70 | 80 | — | — | — |
| B | WEDNESDAY | RETURN ROUTE FOR MEAL | 70 | 60 | — | 70 | 80 | — | — | — |
| … | … | … | … | … | … | … | … | … | … | … |

FORECAST →

FIG. 5B

ELECTRIC VEHICLE CHARGE CONTROL SYSTEM

CROSS REFERENCES TO RELATED APPLICATIONS

The present application claims priority under 35 U.S.C. §119 to Japanese Patent Application No. 2011-085801, filed Apr. 7, 2011, entitled "Electric Vehicle Charge Control System." The contents of this application are incorporated herein by reference in their entirety.

TECHNICAL FIELD

The present disclosure relates to an electric vehicle charge control system for controlling charging of a battery included in an electric vehicle.

BACKGROUND OF THE INVENTION

Description of the Related Art

Electric vehicles include batteries for supplying electric power to an electric motor. The storage level of present batteries is not sufficiently high, and a distance that can be traveled by an electric vehicle per battery charge is short. Accordingly, the general users of electric vehicles tend to relatively frequently charge batteries in the electric vehicles at home or a charging stand, and tend to fully charge the batteries at the time of each charging.

Japanese Unexamined Patent Application Publication No. 2009-89756 discloses a small-sized motorized vehicle that travels by driving an electric motor to which electric power is supplied from a battery included therein. The small-sized motorized vehicle calculates the amount of power remaining in the battery at the time of arrival at a registered location (for example, home) directly from a current location on the basis of the current remaining amount of power and the amount of power necessary to arrive at the registered location. When the calculated amount of power remaining in the battery at the time of arrival at the registered location is smaller than a predetermined value, the small-sized motorized vehicle prompts a driver to go home or charge the battery (see FIG. 7 and an explanation with reference to FIG. 7 of Japanese Unexamined Patent Application Publication No. 2009-89756).

The small-sized motorized vehicle disclosed in Japanese Unexamined Patent Application Publication No. 2009-89756 prevents the battery from being exhausted during travelling by notifying a driver of information about arrival at the registered location prior to the depletion of the battery.

On the other hand, from the viewpoint of extending the life of a battery, the full charge of the battery is undesirable. It is desired that the battery be partially charged and the number of charges be minimized.

SUMMARY OF THE INVENTION

It is desirable to provide an electric vehicle charge control system capable of preventing the depletion of a battery and extending the life of the battery.

An electric vehicle charge control system according to an embodiment of the present disclosure includes a history recording unit configured to record a usage of an electric vehicle including an amount of power consumption of the electric vehicle in each period as a period-by-period usage history, a charge determination unit configured to predict a future amount of power consumption of the electric vehicle from the period-by-period usage history, determine whether charging of a battery in the electric vehicle is necessary on the basis of the predicted future amount of power consumption and a current remaining amount of power of the battery, and calculate a target remaining amount of power that is a level to which the battery is charged in a case where it is determined that charging of the battery is necessary, and a charging unit configured to charge the battery on the basis of results of the determination of whether charging of the battery is necessary and the calculation of the target remaining amount of power which are performed by the charge determination unit.

According to an embodiment of the present disclosure, the future amount of power consumption of the electric vehicle is predicted from the period-by-period usage history. On the basis of the predicted future amount of power consumption and the remaining amount or power of the battery, the determination of whether charging of the battery is necessary and the calculation of the target remaining amount of power are performed. On the basis of results of the determination and the calculation, the battery is charged. Accordingly, the number of charges of the battery can be reduced, and the remaining amount of power after charging can be reduced from the largest remaining amount of power at the time of full charge of the battery. It is therefore possible to extend the life of the battery while preventing battery depletion during the travel of the electric vehicle.

In the electric vehicle charge control system, the history recording unit preferably records a daily usage history as the period-by-period usage history, and the charge determination unit preferably determines a daily pattern of the electric vehicle including the amount of power consumption of the electric vehicle on the basis of the daily usage histories, predicts the future amount of power consumption on a future day from the daily pattern, and performs the determination of whether charging of the battery is necessary and the calculation of the target remaining amount of power on the basis of the predicted future amount of power consumption and the current remaining amount of power of the battery.

There is commonality among the electric vehicle usage patterns of general users on each day of the week, holidays, or weekdays. Accordingly, the history recording unit records the daily usage history as the period-by-period usage history. The charge determination unit determines the daily pattern of the electric vehicle including the amount of power consumption on the basis of the daily usage histories, predicts the future amount of power consumption on a future day from the daily pattern, and performs the determination of whether charging of the battery is necessary and the calculation of the target remaining amount of power on the basis of the predicted future amount of power consumption and the current remaining amount of power of the battery. As a result, it is possible to increase the accuracy of determining whether the charging of the battery is necessary and the accuracy of calculating the target remaining amount of power.

In the electric vehicle charge control system, the history recording unit preferably records the daily usage history including driver information about who has driven the electric vehicle, and the charge determination unit preferably determines the daily pattern including the driver information on the basis of the daily usage histories, predicts a driver on the next day from the daily pattern including the driver information, and calculates the target remaining amount of power corresponding to the predicted driver on the next day.

According to an embodiment of the present disclosure, a driver on the next day is predicted, the target remaining amount of power is calculated on the basis of the predicted driver, and the battery is charged on the basis of the target remaining amount of power. Accordingly, even in a case where the amount of power consumption of the electric vehicle varies from driver to driver, the remaining amount of power after the operation of the electric vehicle on the next day can be balanced. It is therefore possible to prevent the next battery charging time from being brought forward and prevent the battery from being unnecessarily charged to the level of a full charge.

In the electric vehicle charge control system, the charge determination unit preferably sets a standard target remaining amount of power for each of drivers expected to be a next day's driver, sets the standard target remaining amount of power as the target remaining amount of power, changes the target remaining amount of power to a smaller target remaining amount of power that is below the standard target remaining amount of power by a predetermined amount in a case where a next charging day predicted on the basis of the daily pattern is not brought forward even when the smaller target remaining amount of power is set, and changes the target remaining amount of power to a larger target remaining amount of power that is above the standard target remaining amount of power by a predetermined amount in a case where the predicted next charging day is postponed for one or more days by setting the larger target remaining amount of power.

According to an embodiment of the present disclosure, in a case where the predicted next charging day is postponed for one or more days by setting the larger target remaining amount of power that is larger than the standard target remaining amount of power, the target remaining amount of power is changed from the standard target remaining amount of power to the larger target remaining amount of power. As a result, it is possible to reduce the number of charges of the battery and extend the life of the battery.

Furthermore, according to an embodiment of the present disclosure, in a case where the next charging day predicted when the standard target remaining amount of power is set as the target remaining amount of power and the next charging day predicted when the smaller target remaining amount of power that is smaller than the standard target remaining amount of power is set as the target remaining amount of power are the same, the target remaining amount of power is changed from the standard target remaining amount of power to the smaller target remaining amount of power. As a result, it is possible to sufficiently reduce the target remaining amount of power from the level of a full charge without increasing the number of charges. This leads to the increase in the life of the battery.

The electric vehicle charge control system preferably further includes an information unit. In a case where the charge determination unit determines that an actual usage pattern of an actual driver of the electric vehicle on a driving day differs from a predicted usage pattern of a predicted driver on the driving day, the charge determination unit preferably activates the information unit and causes the information unit to transmit a notification that the battery may become exhausted.

According to an embodiment of the present disclosure, in a case where it is predicted from the actual usage of the electric vehicle that power exceeding the predicted amount of power consumption, which is predicted by the charge determination unit with the daily pattern, will be used, the information unit transmits a notification that a battery may become exhausted. As a result, a user can know the possibility of battery depletion in advance and perform appropriate processing such as route change or charging before the occurrence of the battery depletion.

BRIEF DESCRIPTION OF THE DRAWINGS

The advantages of the invention will become apparent in the following description taken in conjunction with the drawings, wherein:

FIGS. 3A and 3B are diagrams describing charge control;

FIGS. 5A and 5B are diagrams describing charge control that is flexibly performed in accordance with the target remaining amount of power;

DETAILED DESCRIPTION OF THE INVENTION

Figure 1:
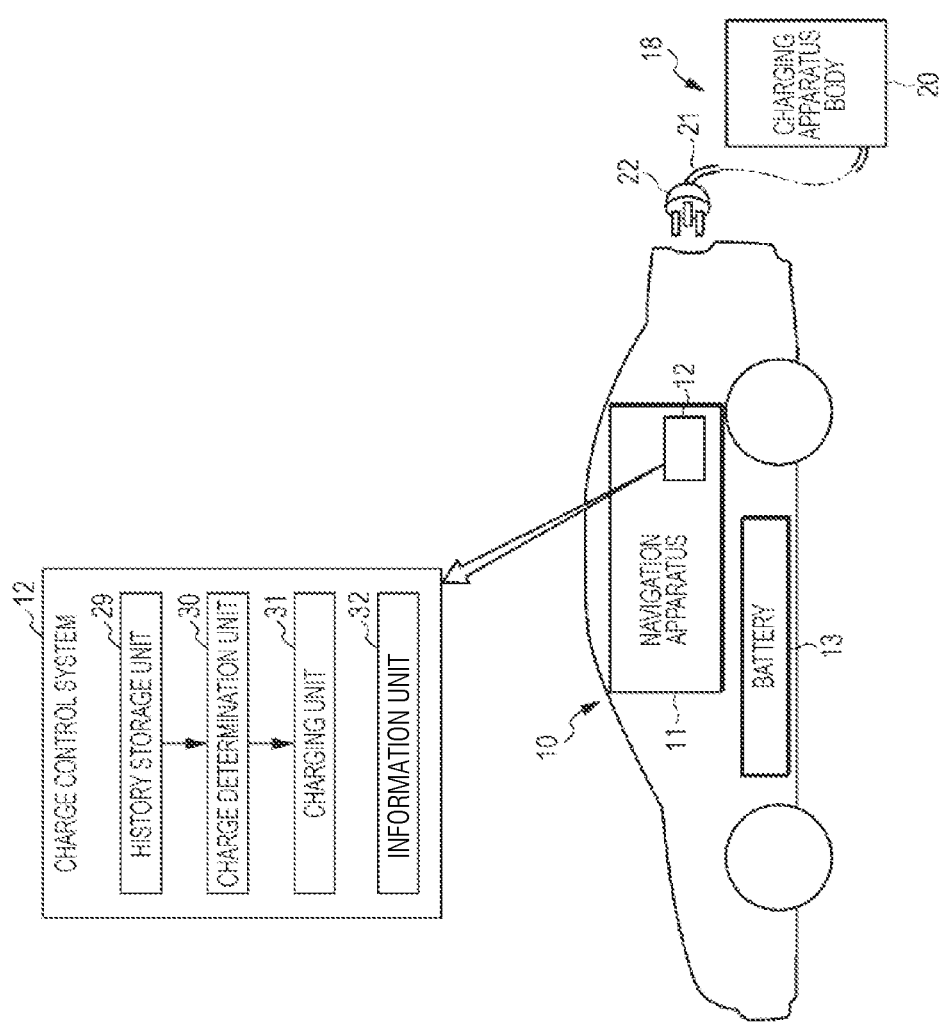
FIG. 1 is a diagram illustrating the configuration of an electric vehicle charge control system in which a charge control system is included in a navigation apparatus in an electric vehicle.

Referring to FIG. 1, an electric vehicle 10 includes a battery 13 for supplying electric power to an electric motor (not illustrated) for driving tires of the electric vehicle 10 and a navigation apparatus 11 including a charge control system 12. In the electric vehicle 10, the charge control system 12, which is included in the navigation apparatus 11, may be separated from the navigation apparatus 11. The configuration of the navigation apparatus 11 will be described in detail later with reference to FIG. 7 along with the description of the relation of connection between the navigation apparatus 11 and a communication control unit 35.

A charging apparatus 18 is disposed at the house and office of an owner of the electric vehicle 10, and will be disposed at a charging stand along a public road in the future. The charging apparatus 18 includes a charging apparatus body 20 and a plug 22 attached to the leading end of a cord 21 extending from the charging apparatus body 20. After a general user has arrived home after a day's use of the electric vehicle 10, the user charges the battery 13 during the night by connecting the plug 22 to a corresponding connector of the electric vehicle 10.

Even when the electric vehicle 10 is connected to the charging apparatus 18, the battery 13 may not be charging. The charge control system 12 determines whether to charge the battery 13. Accordingly, even when the electric vehicle 10 is connected to the charging apparatus 18, the charge control system 12 may have already stopped or terminated the charging of the battery 13.

The charge control system 12 includes a history storage unit 29, a charge determination unit 30, a charging unit 31, and an information unit 32, and controls the charging of the battery 13 when the plug 22 is connected to the electric vehicle 10. The information unit 32 reports to a user various information related to the battery 13 through a display unit 59 and an audio output unit 61 (see FIG. 7). The various information includes possibility of running out of the battery.

Figure 2:
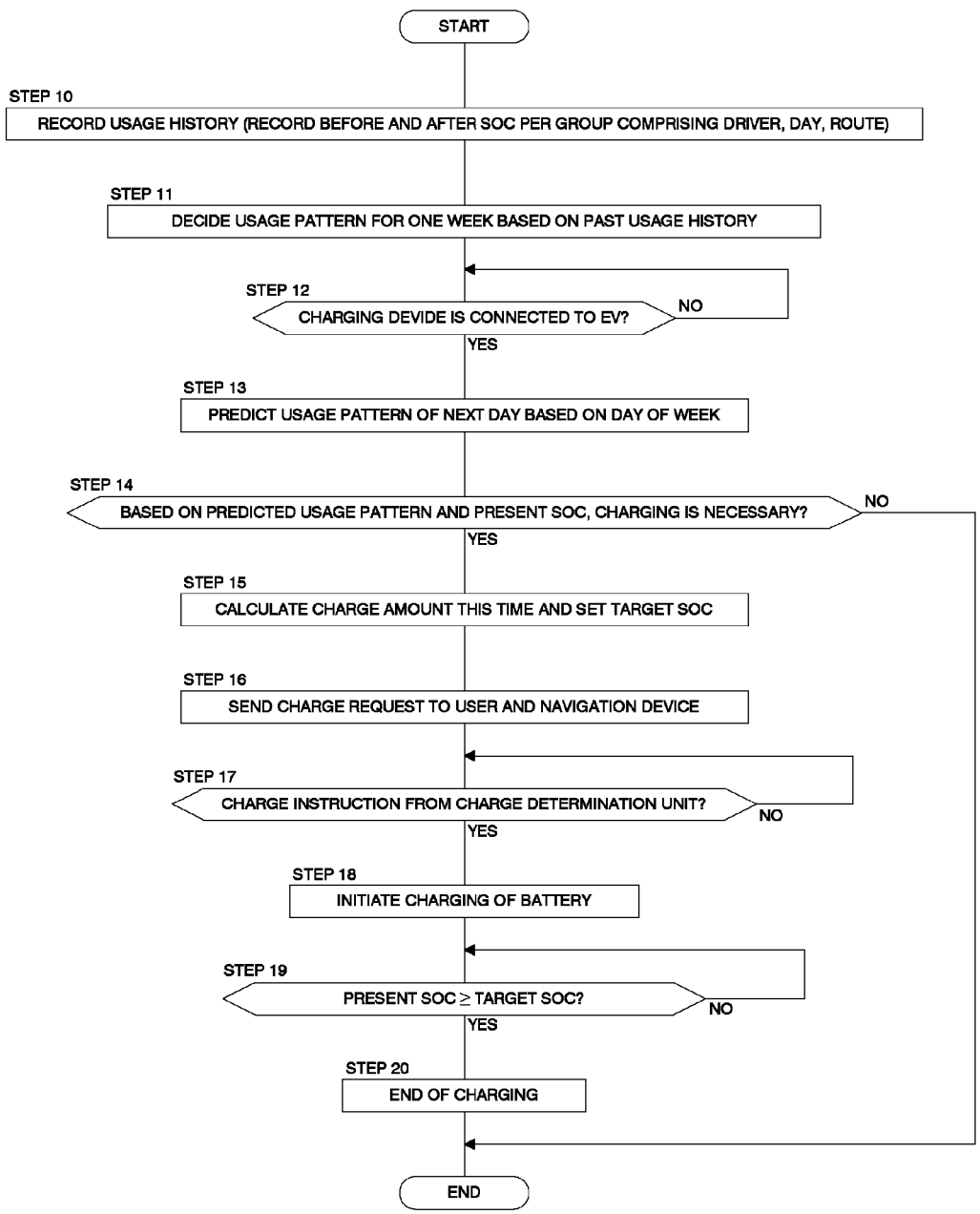
FIG. 2 is a flow chart describing one embodiment of charge control.

FIG. 2 is a flow chart describing charge control method embodied by a computer program which causes a computer to work as the history storage unit 29, the charge determination unit 30, the charging unit 31 and the information unit 32. Before explaining FIG. 2, usage history table of FIGS. 3A, 3B which will be referred to in explanation of each step of FIG. 2 is described. Note that FIGS. 5A, 5B are an explanatory chart related to FIG. 4 and include elements common among the charts of FIGS. 3A, 3B and FIGS. 5A, 5B. Thus, those common elements will be described with respect to FIGS. 3A, 3B.

Figure 3B:
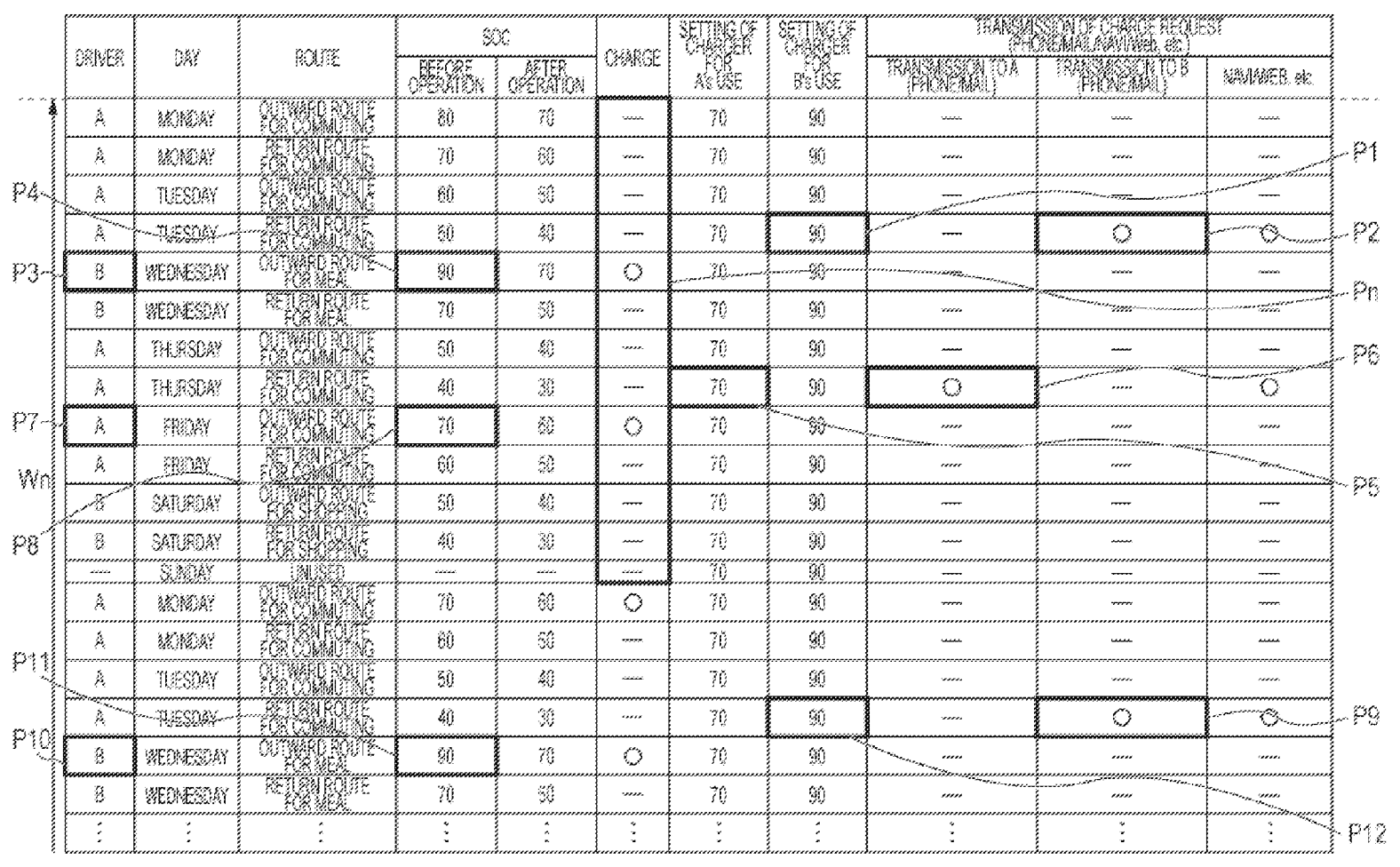
Figure 4:
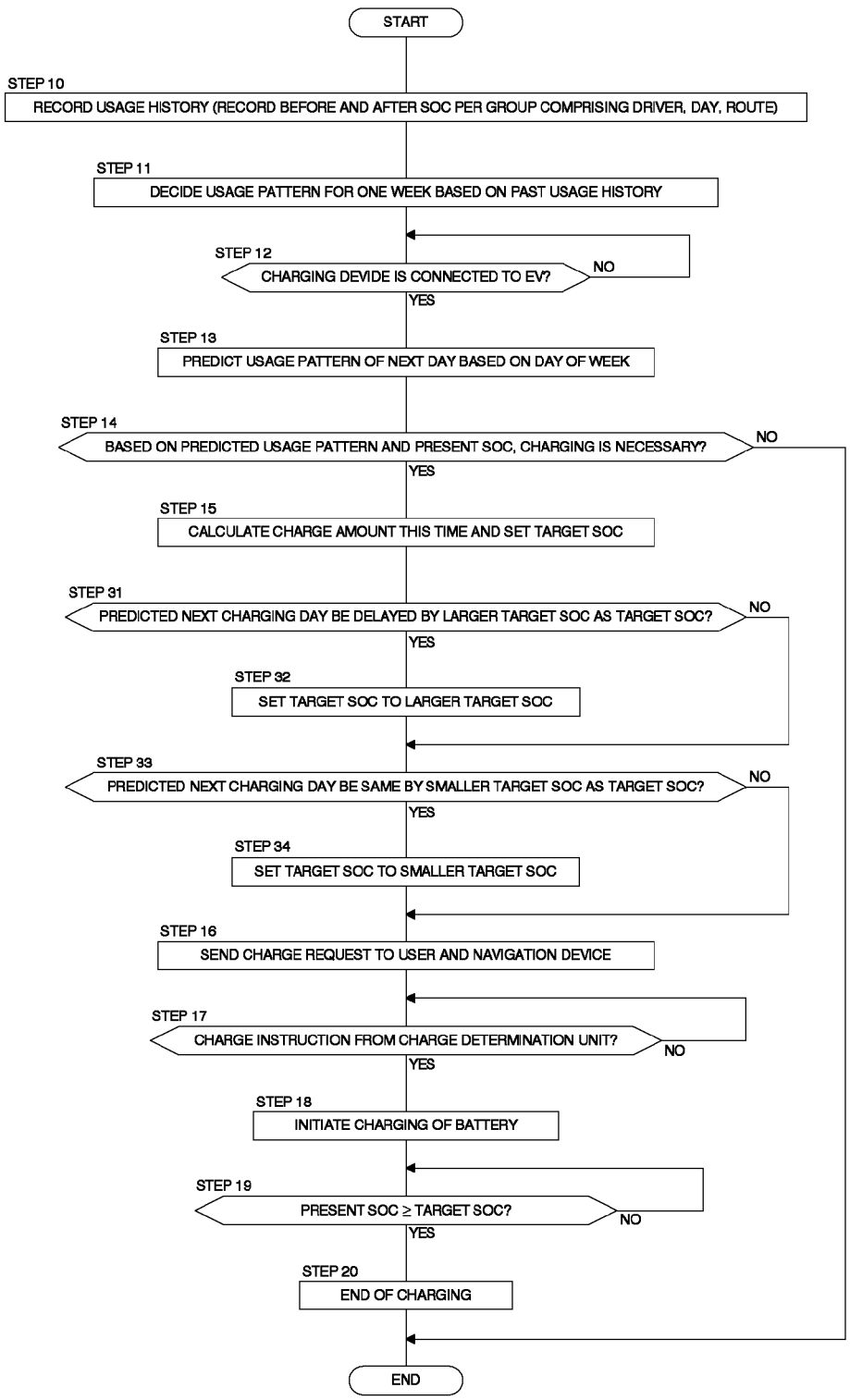
FIG. 4 is a flow chart describing another embodiment of charge control.

With respect to FIGS. 2-4, the "usage history" is used as a concept including a "travel history". The usage history may include not only the travel history of the electric vehicle 10 but also the usage history of an air conditioner affecting the amount of power consumption of the electric vehicle 10 and the history of a payload affecting the amount of power consumption of the battery 13.

Referring to FIGS. 3A, 3B, 5A and 5B, the items of "driver", "day", "route", and "SOC (the remaining amount of power: State Of Charge)" illustrated on the left side of the drawings indicate a usage history. The items of "charge", "setting of charger for A's use", "setting of charger for B's use", and "transmission of charge request" illustrated on the right side of the drawings indicate pieces of processing that are performed by components in the charge control system 12 in accordance with the usage history of the electric vehicle 10. The SOC is expressed on a percentage basis. In a case where the value of the SOC is 100%, the battery 13 is fully charged.

Referring to FIGS. 3A and 3B, usage histories and charge statuses obtained in a week (e.g. Monday to Sunday) in a case where the charge control system 12 does not perform charge control for the battery 13 are illustrated in a range Wo, and usage histories and charge statuses obtained in a period including the same week as that in the range Wo in a case where the charge control system 12 performs charge control for the battery 13 are illustrated in a range Wn. Referring to FIGS. 5A and 5B, usage histories and charge statuses obtained in a case where the charge control system 12 performs another type of charge control for the battery 13 are illustrated.

FIGS. 3A, 3B, 5A and 5B illustrate the operations of the electric vehicle 10 in chronological order from the top to the bottom. In the drawings, the sign of ○ indicates that the battery 13 has been charged before the operation of the electric vehicle 10 on the day. More specifically, for example, the charging of the battery 13 is performed between a time after the operation of the electric vehicle 10 on the previous day and a time before the operation of the electric vehicle 10 on the day. The sign of – indicates that the battery 13 has not been charged before the operation of the electric vehicle 10 on the day. For example, "○" on Wednesday in a column Po indicates that the battery 13 has been charged between a time after the operation on Tuesday and a time before the operation on Wednesday.

Charging represented by ○ in the column Po in the range Wo in FIG. 3A is manually performed, that is, is performed by a user, and charging represented by ○ in a column Pn in the range Wn in FIG. 3B and charging represented by ○ in FIGS. 5A and 5B are automatically performed by the charge control system 12. In the charging (Po) of the battery 13 performed by a user, there are tendencies for the user to bring the battery 13 to the SOC of 100% and prematurely charge the battery 13. As a result, the number of charges is increased and the life of the battery 13 is shortened.

The charge control performed in the range Wn in FIG. 3B, that is, the charge control of the battery 13 which is performed by the charge control system 12, will be described. The charge control system 12 performs automatic charging of the battery 13. In addition, a user can connect the charging apparatus 18 to the electric vehicle 10 and transmit an instruction to charge the battery 13 to the charge control system 12 from a mobile telephone 50 (FIG. 6) of the user or the navigation apparatus 11. The instruction to perform charging made by a user has a higher priority than the determination that charging is unnecessary made by the charge control system 12. When a user provides the instruction to perform charging, the charge control system 12 performs charging regardless of whether it determines that charging is unnecessary. A user can make not only the instruction to immediately start charging but also a charging reservation via the mobile telephone 50 of the user or the navigation apparatus 11. In the charging reservation, a desired date and time at which charging will be performed is designated. The charging reservation also has a higher priority than the determination that charging is unnecessary made by the charge control system 12.

Upon receiving from the charge control system 12 an instruction to transmit a request for charging of the battery 13 to a predetermined user of the electric vehicle 10, the navigation apparatus 11 transmits a charge request to the user by phone or e-mail (FIG. 3B: P2, P6, and P9). The determination of a user to which the charge request is transmitted will be described in detail later. The user, who has received the charge request, connects the plug 22 of the charging apparatus 18 to a corresponding connector of the electric vehicle 10 after a day's use of the electric vehicle 10. The charge control system 12 starts to charge the battery 13 so that the charging of the battery 13 will be completed before the operation of the electric vehicle 10 on the next day. When the charge control system 12 determines that charging is necessary, it automatically starts to charge the battery 13 regardless of whether a charge request has been transmitted to a user via the navigation apparatus 11. On the other hand, when the charge control system 12 determines that charging is unnecessary, the charge control system 12 does not perform charging unless it receives a compulsory charging instruction from a user even in a situation where the plug 22 of the charging apparatus 18 is connected to the electric vehicle 10 by the user.

For example, a route on each day of the week can be detected on the basis of a route to a destination set in the navigation apparatus 11 or a detected change in a current location. For example, the SOC is detected on the basis of the electrode voltage of the battery 13 or is calculated by subtracting the summation of measured power consumption values from the amount of charge at the time of the last charging.

Returning to FIG. 2, in STEP 10, the history storage unit 29 relates the driver, the day and the route with each other to make an identifiable group. The history storage unit 29 records the before-operation SOC and the after-operation SOC for each identifiable group as the usage history of the electric vehicle 10 (see left side of FIGS. 3A, 3B, 5A and 5B).

For example, it is possible to determine who will drive the electric vehicle 10 by causing a driver to touch a predetermined button on the touch panel of the navigation apparatus 11 at the time of start of driving. Alternatively, it is possible to identify a driver of the electric vehicle 10 by detecting the position of a driver's seat in a longitudinal direction and the angles of sideview mirrors and a room mirror which have been changed by the driver before driving. A driver of the electric vehicle 10 may be identified by disposing a weight sensor at a driver's seat and detecting the weight of the driver with the weight sensor.

The table in FIGS. 3A and 3B illustrates only usage histories of the electric vehicle 10 in about a single week for the simplification of the drawing. In reality, the history storage unit 29 can, in STEP 10, write usage histories in the last several weeks into a nonvolatile memory such as a hard disk and stores them. The charge determination unit 30 refers to the usage histories stored in the history storage unit 29, determines features (including tendency, and similarity or sameness) of a route and a power consumption for each day, weekdays, and holidays, and determines a usage pattern for each day of the week on the basis of the features. Specific method for determining the usage pattern will be described later with STEP 11.

A usage pattern for each day of the week is associated with the amount of power consumption of the battery 13 per day, a driver on the day, and/or a travel route on the day. In a case where a usage pattern is associated with only the amount of power consumption of the battery 13 per day, for example, the maximum number of usage histories having the same feature of the amount of power consumption and the same feature of a driver are extracted from usage histories on days in the last several weeks and an average or a median value of the amounts of power consumption in the extracted usage histories is associated with the usage pattern. There is a case where there is not much difference between the amounts of power consumption of the battery 13 per day associated with usage patterns for different days of the week, that is, a case where the difference between each of the amounts of power consumption per day associated with usage patterns for different days of the week and the reference amount of power consumption is equal to or smaller than a predetermined value. In this case, the same usage pattern can be set for different days of the week.

Seven usage patterns or less, each of which is associated with only the amount of power consumption of the battery 13 per day, are obtained. In cases where the use of the electric vehicle 10 is organized in units of not one week but two weeks and different features are extracted at the end of month and in the other period, a plurality of usage patterns are determined for the same day of the week.

The history storage unit 29 obtains a usage history of the electric vehicle 10 including the items of driver, day, route, and/or SOC (corresponding to the amount of power consumption) for each day of the week. The SOC is expressed on a percentage basis. In a case where the value of the SOC is 100%, the battery 13 is fully charged. The following usage patterns are obtained from the usage histories illustrated in FIGS. 3A and 3B. Referring to FIGS. 3A, 3B, 5A and 5B, it is assumed that a driver A is a husband in a family and a driver B is a wife in the family. In a case where a usage pattern is determined on the basis of a driver and a route, the following usage patterns (a) to (d) are obtained: (a) On weekdays from Monday to Friday (except for Wednesday), the driver A uses the electric vehicle 10 for only commuting, the amount of power consumption on each day is approximately 20%, and this usage pattern is hereinafter referred to as a "A commuting pattern" as appropriate, (b) On Saturday, the driver B uses the electric vehicle 10 for only shopping, the amount of power consumption on the day is approximately 20%, and this usage pattern is hereinafter referred to as a "B shopping pattern" as appropriate, (c) On Wednesday, the driver B uses the electric vehicle 10 for a meal, the amount of power consumption on the day is approximately 40% in a round trip, and this usage pattern is hereinafter referred to as a "B meal pattern" as appropriate on the assumption that this usage pattern is a general travel pattern on Wednesdays although it cannot be determined whether this usage pattern is a general usage pattern obtained every Wednesday or a usage pattern obtained in only Wednesdays illustrated in FIGS. 3A and 3B without referring to usage histories on other Wednesdays, and (d) On Sunday, the electric vehicle 10 is not used and this usage pattern is hereinafter referred to as a "non-usage pattern" as appropriate on the assumption that this usage pattern is a general travel pattern on Sundays although it cannot be determined whether this usage pattern is a general usage pattern obtained every Sunday or a usage pattern obtained in only Sundays illustrated in FIGS. 3A and 3B without referring to usage histories on other Sundays.

The obtained usage patterns, the A commuting pattern, the B shopping pattern, the B meal pattern, and the non-usage pattern, are individually associated with days of the week and drivers, and are also associated with the amounts of power consumption of 20%, 20%, 40%, and 0%, respectively. Subsequently, these usage patterns are registered.

There is another usage pattern extraction method that uses only the amount of power consumption on each day. In this method, usage patterns for different drivers and different routes can be combined into a single usage pattern. For example, since the amount of power consumption of the battery 13 is 20% on weekdays (Monday to Friday) except for Wednesday and Saturday, the usage patterns associated with these days can be combined into a single usage pattern, that is, a "20% pattern". However, as will be described later, in a case where it is determined whether an actual usage pattern of the electric vehicle 10 on a driving day is a predicted usage pattern and the possibility that the battery 13 will become exhausted is notified to a user when it is determined that the actual usage pattern of the electric vehicle 10 on the driving day is not the predicted usage pattern, the integration of usage patterns for different drivers and different routes into a single usage pattern is undesirable. In order to make an accurate notification, the acquisition of a usage pattern based on a driver and a route is desirable.

Referring back to FIG. 2, the charge determination unit 30 extracts one or more usage patterns (the A commuting pattern, the B shopping pattern, the B meal pattern, and the non-usage pattern) per week on the basis of the past usage histories (STEP 11).

In STEP 12, the charge determination unit 30 determines whether the charging apparatus 18 is connected to the electric vehicle 10, and when the charging apparatus 18 is connected to the electric vehicle 10, the charge determination unit 30 proceeds to STEP 13. The charge determination unit 30 predicts a usage pattern on the next day in STEP 13 and determines whether the charging of the battery 13 is necessary on the basis of the predicted usage pattern and the present SOC of the battery 13 in STEP 14. When the charge determination unit 30 determines that the charging of the battery 13 is necessary, it proceeds to STEP 15, calculates the amount of charge at this time, and sets the SOC after charging (called as "target SOC") in STEP 15. Here, the target SOC is expressed as target SOC=SOC before charging+amount of charge at this time.

The determination of whether charging is necessary is made in consideration of the need to extend the life of the battery 13, that is, the need to prevent the battery 13 from being fully charged, reduce the amount of charge of the battery 13, and minimize the number of charges of the battery 13, while ensuring the amount of charge of the battery 13 necessary for the travel of the electric vehicle 10 on the next day. More specifically, for example, a plurality of standards are set as first to third standards in order of precedence. The determination of whether charging is necessary and the SOC after charging (the target SOC) are determined so that the standard having the highest priority is first met and then the standard having the next highest priority is met.

In the first standard, the SOC is ensured with which battery depletion (battery depletion means that SOC≈0 or SOC<a predetermined value) does not occur in the operation of the electric vehicle 10 on the next day. The reason why the avoidance of battery depletion in the next day's operation is needed is that the number of charges is limited to one per day in the examples illustrated in FIGS. 3A, 3B, 5A and 5B. If the number of charges is limited to one or less per a plurality of days, the SOC after charging is calculated so that battery depletion does not occur in an operation that lasts for these days.

In the second standard, when charging is performed at this time, the SOC after charging at this time is determined so that the next predicted charging day is postponed.

In the third standard, the SOC after charging at this time is determined so that a battery is prevented from being fully charged and the amount of charge of the battery is minimized.

By using an example of FIGS. 3A and 3B, further explanation will be provided regarding the determination by the charge determination unit 30 in STEP 14 for the necessity of charging, and regarding the calculation of the amount of charge in STEP 15 when the charge determination unit 30 determines charging is necessary.

In FIGS. 3A and 3B, on each day, after the operation of the electric vehicle 10, it is determined whether charging is necessary. In a case where a usage pattern on the next day is the A commuting pattern or the B shopping pattern, the predicted amount of power consumption on the next day is small (is equal to or less than 20%). Accordingly, it is determined that charging is necessary when the SOC is equal to or less than 30% (for example, in the case of the SOC after the operation on the day preceding the day corresponding to A represented by P7), and it is determined that charging is unnecessary when the SOC is equal to or greater than 30%. On the other hand, in a case where a usage pattern on the next day is the B meal pattern, the predicted amount of power consumption on the next day is large (is approximately 40%). Accordingly, it is determined that charging is necessary when the SOC is equal to or less than 40% (for example, in the case of the SOC after the operation on the day preceding the day corresponding to B represented by P3 and P10), and it is determined that charging is unnecessary when the SOC is greater than 40%.

In a case where the usage pattern on the next day is the non-usage pattern, it is determined which of 30% and 40% is used as an criterion SOC value on the basis of the predicted amount of power consumption corresponding to the usage pattern on the day of the first operation of the electric vehicle 10 after the next day (in FIGS. 3A and 3B, the usage pattern on Monday after Sunday that is the next day on which the non-usage pattern is set). In a case where the usage pattern on the next day is the non-usage pattern, a charging day can be postponed to a day preceding the first operation of the electric vehicle 10 after the next day.

The SOC after the charging of the battery 13 (that is, the target SOC=the SOC before charging+the amount of charge at this time) is set to TARGET SOC=70% (P5) in a case where a driver associated with the usage pattern on the next day is A (P7) whose driving is determined to consume a small amount of power per day on the basis of the past history, and is set to TARGET SOC=90% (P1 and P12) in a case where a driver associated with the usage pattern on the next day is B (P3 and P10) whose driving is determined to consume a large amount of power per day on the basis of the past history. The battery 13 is charged to the target SOC (P4, P8, and P11).

Referring back to FIG. 2, in STEP 16, the charge determination unit 30 transmits a charge request to a user and the navigation apparatus 11. The transmission of the charge request to the navigation apparatus 11 is performed regardless of who will drive on the next day, and a message saying that charging is necessary is displayed on the display screen of the navigation apparatus 11. On the other hand, the transmission of the charge request to a user is performed as needed so that a driver expected to drive on the next driving day receives the charge request (FIG. 3: P2, P6, and P9). That is, referring to FIG. 3B, after the operation on Tuesday, charging is necessary before the start of an operation on Wednesday and a charge request is transmitted to B on Tuesday (P2). After the operation on Thursday, charging is necessary before the start of an operation on Friday and a charge request is transmitted to A on Thursday (P6). The navigation apparatus 11 may lead a driver to a charging stand after displaying the charge request.

Upon receiving a charging instruction from the charge determination unit 30 in STEP 17, the charging unit 31 initiates charging by current feeding from the charging apparatus 18 to the battery 13 in STEP 18. In STEP 19, the charging unit 31 detects the present SOC of the battery 13 and determines if the present SOC reaches the target SOC. When the present SOC of the battery 13 reaches the target SOC, the charging unit 31 disconnects the battery 13 from the charging apparatus 18 and completes the charging of the battery 13 at this time in STEP 20. For example, the SOC of the battery 13 can be detected from the voltage at the positive terminal of the battery 13.

The above embodiment may have the following variations. For example, before the charging instruction to the charging unit 31 in STEP 17, the charge determination unit 30 may determine whether the plug 22 of the charging apparatus 18 is connected to the electric vehicle 10 and instruct the charging unit 31 to perform charging only during the connection between them in STEP 17. Alternatively, the charge determination unit 30 may notify the charging unit 31 of the charging instruction and the amount of charge at an appropriate time, for example, at the time the electric vehicle 10 arrives home, and the charging unit 31 may perform the charging of the battery 13 as soon as the plug 22 of the charging apparatus 18 is connected to the electric vehicle 10. For this purpose, the charging unit 31 may initiate to monitor whether the plug 22 of the charging apparatus 18 is connected to the electric vehicle 10 after receiving the notification from the charge determination unit 30.

Next, explanation will be provided regarding the information unit 32 (FIG. 1) of the charge control system 12. Since the usage of the electric vehicle 10 is variable, the predicted driver and the predicted usage pattern of the electric vehicle 10, which have been acquired by the charge determination unit 30, may not match the actual driver and the actual usage pattern of the electric vehicle 10. At that time, the amount of power consumption in the case of the predicted usage pattern of the predicted driver may be larger than that in the case of the actual usage pattern of the actual driver, but is generally smaller than that in the case of the actual usage pattern of the actual driver. For example, such a phenomenon appears in a situation where the driver A, who usually uses the electric vehicle 10 for commuting on weekdays, takes a paid holiday and uses the electric vehicle 10 for something such as a trim other than commuting.

In order to meet such a situation, in the charge control system 12 including the information unit 32, the charge determination unit 30 activates the information unit 32 as soon as the charge determination unit 30 determines that the actual usage pattern of the actual driver differs from the predicted usage pattern of the predicted driver and causes the information unit 32 to inform the driver of the possibility that battery depletion will occur. More specifically, the information unit 32 informs the driver of the possibility that battery depletion will occur by displaying a text or an image on a display unit 59 (FIG. 7) or outputting sound from an audio output unit 61

Figure 7:
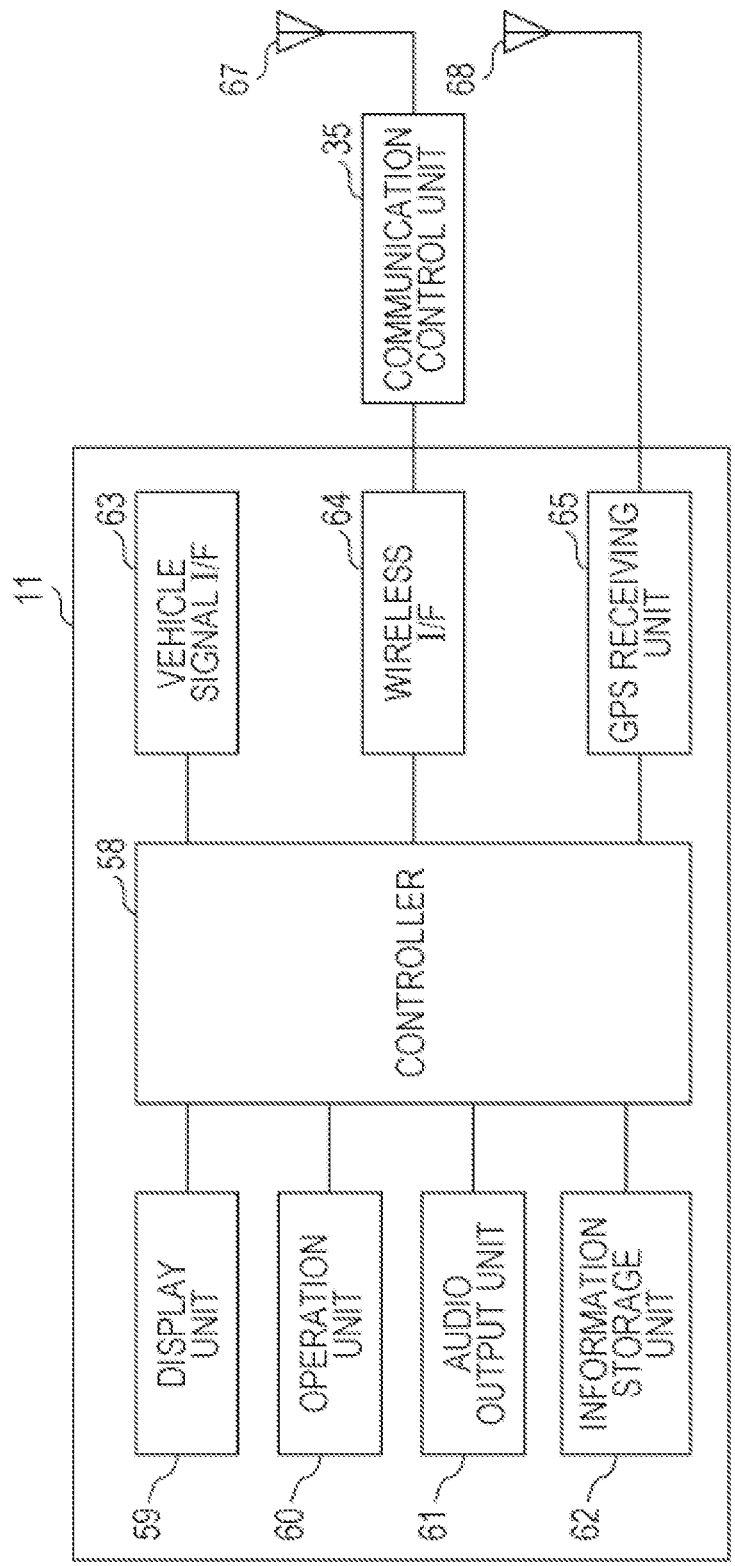
FIG. 7 is a diagram illustrating the configuration of a navigation apparatus.

(FIG. 7). As a result, the driver can perform appropriate processing such as route change or charging before the occurrence of battery depletion.

The charge determination unit 30 can determine whether the predicted usage pattern of the electric vehicle 10 on a driving day differs from the actual usage pattern of the electric vehicle 10 on the driving day on the basis of the time at which the electric vehicle 10 is used (for example, the electric vehicle 10 is used for commuting in the morning and the evening, but is actually used during the daytime) or the travel route of the electric vehicle 10 (for example, a travel route for commuting is a route between home and an office, but an actual travel route differs from the travel route).

FIG. 4 is a flow chart describing another embodiment of charge control method. This embodiment is, similarly to the charge control method of FIG. 2, embodied by a computer program which causes a computer to work as the history storage unit 29, the charge determination unit 30, the charging unit 31 and the information unit 32. The flow chart of FIG. 4 is different from FIG. 2 in that the steps of STEP 31 to STEP 34 are inserted between STEP 15 and STEP 16.

In the method of FIG. 2, the target SOC of the battery 13 is determined in accordance with a driver who is associated with the usage pattern of the next day (STEP 15). Hereinafter, the target SOC set in STEP 15 is called as "standard target SOC." In the charge control method of FIG. 4, even if the same driver is associated with the usage pattern of the next day, the target SOC is varied based on the estimated date of the next charging after the charging at this time (STEP 31 to STEP 34).

Specifically, referring to FIGS. 5A and 5B, the target SOC is flexibly determined as follows even in a case where the same driver is associated with the usage pattern on the next day. In a case where the predicted next charging day can be postponed by setting the target SOC to a value (the larger target SOC) in a predetermined range above the standard target SOC (70% or 90%) (STEP 31), the target SOC is set to the larger target SOC(STEP 32). In a case where the predicted next charging day is not brought forward and thus remains the same even when the target SOC is set to a value (the smaller target SOC) in a predetermined range below the standard target SOC (STEP 33), the target SOC is set to the smaller target SOC (STEP 34).

Referring to FIGS. 5A and 5B, the smaller target SOC (80%) that is smaller than the standard target SOC (90%) is set for B (P32). Here, it is assumed that now is after the operation on Tuesday. Since a current SOC is equal to or less than 40% and a driver associated with a usage pattern on Wednesday that is the next day is B, it is determined that charging is necessary. In the case of standard charging, the SOC after charging is set to 90%. Even when the SOC after charging is set to 80%, the predicted next charging time is a time after an operation on Thursday like in the case of the standard charging. As described previously, the same criterion of the determination of whether charging is necessary is used in both of the example illustrated in FIGS. 3A and 3B and the example illustrated in FIGS. 5A and 5B. That is, it is determined that charging is necessary when a driver on the next day is A and the current SOC is equal to or less than 30% and when a driver on the next day is B and the current SOC is equal to or less than 40%.

The change in the SOC after charging in which the SOC after charging is set to 90% (which is the standard target SOC) has been performed subsequent to the operation on Tuesday is represented by values outside parentheses in a range P31, and the change in the SOC after the SOC after charging has been set to 80% subsequent to the operation on Tuesday is represented by values inside the parentheses in the range P31.

In a case where the target SOC is set to 80% subsequent to the operation on Tuesday, the SOC is equal to or less than 30%, which is a charging necessity determination criteria value for A associated with the usage pattern on Friday, after the operation performed by an outward route for commuting in the first half of Thursday. However, charging is not performed in the middle of Thursday. After the operation performed by a return route for commuting in the latter half of Thursday, it is determined whether charging is necessary. Since the SOC at that time is 20%, charging is performed. This charging day is the same as that set in a case where the target SOC is set to the standard SOC of 90% after the operation on Tuesday. Accordingly, the charge control system 12 sets the target SOC subsequent to the operation on Tuesday to 80% so as to extend the life of the battery 13.

The operations described as STEP 31 to STEP 34 of FIG. 4 are not limited to this embodiment. For example, as variations, the charge control system 12 may be configured in which the operations for the smaller target SOC of STEP 33 and STEP 34 are performed first, then the operations for the larger target SOC of STEP 31 and STEP 32 are performed next. Moreover, considering the property of a battery subject to charging, the charge control system 12 may be configured in which the operations for the larger target SOC of STEP 31 and STEP 32 are performed without the operations for the smaller target SOC of STEP 33 and STEP 34. Furthermore, the charge control system 12 may be configured in which the operations for the smaller target SOC of STEP 33 and STEP 34 are performed without the operations for the larger target SOC of STEP 31 and STEP 32.

Figure 6:
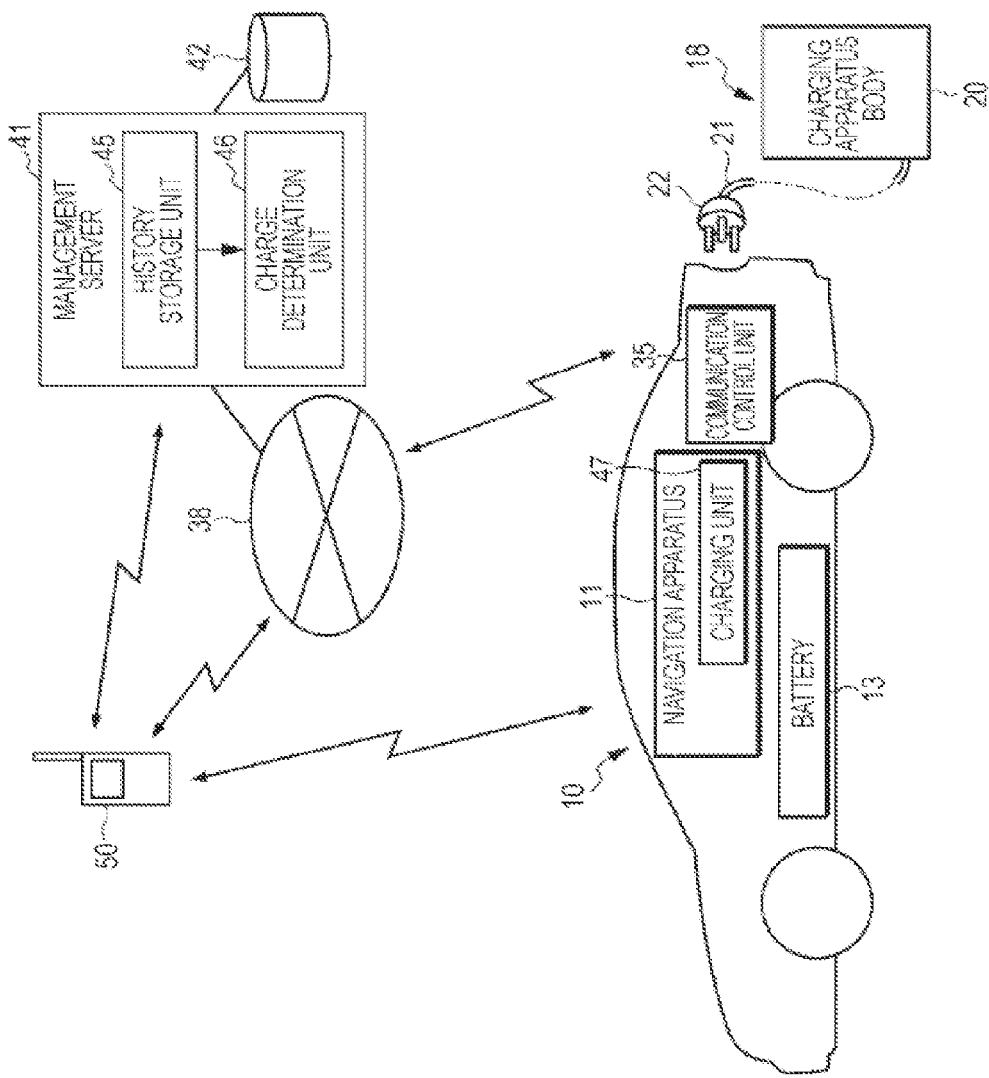
FIG. 6 is a diagram illustrating the configuration of an electric vehicle charge control system in which a charge control system is included in a management server on the Internet.

In an electric vehicle charge control system illustrated in FIG. 6, the electric vehicle 10 includes the communication control unit 35. The communication control unit 35 is wirelessly connected to the Internet 38, and transmits/receives data to/from a management server 41 via the Internet 38. Before detailed explanation with reference to FIG. 6, the navigation apparatus 11 and the communication control unit 35 will be described with reference to FIG. 7.

Referring to FIG. 7, the navigation apparatus 11 includes a controller 58, the display unit 59 that transmits/receives various signals including a control signal to/from the controller 58, an operation unit 60, the audio output unit 61, an information storage unit 62, a vehicle signal I/F 63, a wireless I/F 64, and a GPS receiving unit 65.

The display unit 59 displays a map, a current location, and a recommended route from the current location to a destination on the basis of data from the controller 58. The operation unit 60 is operated by a user when the user inputs various instructions into the navigation apparatus 11. The display unit 59 and the operation unit 60 may be integrated into a single touch-panel display. The audio output unit 61 outputs sound for route guidance and the notification of various pieces of information. The information storage unit 62 stores pieces of data including map data. The vehicle signal I/F 63 is used for the transmission of a signal between the controller 58 and a sensor (not illustrated) such as a vehicle speed sensor for detecting information about the determination of a current location.

The wireless I/F 64 is used for the transmission of a signal between the controller 58 and the communication control unit 35. The communication control unit 35 communicates with the Internet 38 (FIG. 6) by transmitting/receiving an electric wave via an antenna 67. The GPS receiving unit 65 catches a GPS wave transmitted from a GPS satellite with an antenna 68 and determines a current location on the basis of the GPS wave.

Referring back to FIG. 6, the management server 41 collects various pieces of information from a plurality of electric vehicles 10 via the Internet 38 and stores these pieces of information in a database 42. The pieces of information collected by the management server 41 may include not only the usage histories of the electric vehicles 10 but also pieces of information about the traceability of components in the electric vehicles 10. The management server 41 uses the pieces of traceability information for the notification of a replacement time of the battery 13 and the provision of customer service (for example service for valuing the electric vehicle 10 for trade-in in consideration of the lifetime of the battery 13).

The management server 41 transmits a notification that the charging of the battery 13 in the electric vehicle 10 is necessary to a mobile telephone 50 of an owner of the electric vehicle 10 via the Internet 38. At that time, for example, a text "charge your vehicle" is displayed on a display unit in the mobile telephone 50. In the charge control system 12 illustrated in FIG. 1, a notification that the charging of the battery 13 is necessary can be also transmitted from the communication control unit 35 to the mobile telephone 50 via the Internet 38. In a case where the navigation apparatus 11 has a mobile telephone function, the transmission of the notification from the navigation apparatus 11 to the mobile telephone 50 can be performed through telephone lines of a telephone company without using the Internet 38.

A history storage unit 45 and a charge determination unit 46 are included in the management server 41 connected to the Internet 38, and a charging unit 47 is included in the navigation apparatus 11. The history storage unit 45 has a configuration and a function similar to those of the history storage unit 29 illustrated in FIG. 1, and the charge determination unit 46 has a configuration and a function similar to those of the charge determination unit 30 illustrated in FIG. 1. The differences between the history storage unit 45 and the history storage unit 29 and between the charge determination unit 46 and the charge determination unit 30 are that whereas the history storage unit 29 and the charge determination unit 30 are used to control the charging of only the electric vehicle 10 including them, the history storage unit 45 and the charge determination unit 46 are used to control the charging of a plurality of electric vehicles 10. Parts of the configurations and the functions of the history storage unit 45 and the charge determination unit 46 which are intended for the battery 13 in each of the electric vehicles 10 are the same as those of the history storage unit 29 and the charge determination unit 30 illustrated in FIG. 1, respectively.

That is, the history storage unit 45 collects the usage histories of a plurality of electric vehicles 10 from the electric vehicles 10 via the Internet 38 and stores them in the management server 41. The charge determination unit 46 extracts the usage pattern of each of the electric vehicles 10 on a day-by-day basis, determines whether the charging of the battery 13 in the electric vehicle 10 is necessary on the basis of the extracted usage pattern, and calculates the amount of charge of the battery 13 when determining that the charging of the battery 13 is necessary. Information about the necessity of charging of the battery 13 in each of the electric vehicles 10 and information about the amount of charge of the battery 13 calculated by the charge determination unit 46 when it is determined that the charging of the battery 13 in the electric vehicle 10 is necessary are transmitted to the charging unit 47 in the electric vehicle 10 via the Internet 38.

The charging unit 47 has a configuration and a function similar to those of the charging unit 31 illustrated in FIG. 1. The difference between them is that whereas the charging unit 31 receives information about a charging time and information about the amount of charge directly from the charge determination unit 30, the charging unit 47 receives information about a charging time and information about the amount of charge from the charge determination unit 46 in the management server 41 outside the electric vehicle 10 via the communication control unit 35. Upon receiving an instruction for charging the battery 13 from the charge determination unit 46 via the Internet 38, the charging unit 47 charges the battery 13 by the amount of charge instructed by the charge determination unit 46 (until the battery 13 reaches the target SOC).

The embodiments of the present disclosure have been described in detail. Various design changes can be made to these embodiments without departing from the scope of the present disclosure.

For example, referring to FIGS. 3A and 3B, on the basis of the predicted amount of power consumption associated with a usage pattern on only the next day and the SOC of the battery 13, it is determined whether the charging of the battery 13 is necessary and the amount of charge when it is determined that the charging of the battery 13 is necessary is calculated. However, they can be performed on the basis of the predicted amounts of power consumption associated with usage patterns on a predetermined number of following days and the SOC of the battery 13.

Usage patterns on a day-by-day basis are used and are individually associated with the amounts of power consumption. However, in a case where the use cycle of the electric vehicle 10 is a half day or two days, usage patterns in units of half days or two days can be used.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. An electric vehicle charge control system comprising:
a history recording unit configured to record a usage of an electric vehicle including an amount of power consumption of the electric vehicle in each period as a period-by-period usage history;
a charge determination unit configured to predict a future amount of power consumption of the electric vehicle from the period-by-period usage history, determine whether charging of a battery in the electric vehicle is necessary on the basis of the predicted future amount of power consumption and a present remaining amount of power of the battery, and calculate a target remaining amount of power that is a level to which the battery is charged in a case where it is determined that charging of the battery is necessary; and
a charging unit configured to charge the battery on the basis of results of the determination of whether charging of the battery is necessary and the calculation of the target remaining amount of power which are performed by the charge determination unit.

2. The electric vehicle charge control system according to claim 1,
wherein the history recording unit records a daily usage history as the period-by-period usage history, and
wherein the charge determination unit determines a daily pattern of the electric vehicle including the amount of power consumption of the electric vehicle on the basis of the daily usage histories, predicts the future amount of power consumption on a future day from the daily pattern, and performs the determination of whether charging of the battery is necessary and the calculation of the target remaining amount of power on the basis of the predicted future amount of power consumption and the present remaining amount of power of the battery.

3. The electric vehicle charge control system according to claim 2,
wherein the history recording unit records the daily usage history including driver information about who has driven the electric vehicle, and
wherein the charge determination unit determines the daily pattern including the driver information on the basis of the daily usage histories, predicts a driver on the next day from the daily pattern including the driver information, and calculates the target remaining amount of power corresponding to the predicted driver on the next day.

4. The electric vehicle charge control system according to claim 3, wherein the charge determination unit sets a standard target remaining amount of power for each of drivers expected to be a next day's driver, sets the standard target remaining amount of power as the target remaining amount of power,
changes the target remaining amount of power to a smaller target remaining amount of power that is below the standard target remaining amount of power by a predetermined amount in a case where a next charging day predicted on the basis of the daily pattern is not brought forward even when the smaller target remaining amount of power is set, and
changes the target remaining amount of power to a larger target remaining amount of power that is above the standard target remaining amount of power by a predetermined amount in a case where the predicted next charging day is postponed for one or more days by setting the larger target remaining amount of power.

5. The electric vehicle charge control system according to claim 4, further comprising an information unit, and
wherein, in a case where the charge determination unit determines that an actual usage pattern of an actual driver of the electric vehicle on a driving day differs from a predicted usage pattern of a predicted driver on the driving day, the charge determination unit activates the information unit and causes the information unit to transmit a notification that the battery may become exhausted.

6. The electric vehicle charge control system according to claim 3, wherein the charge determination unit sets a standard target remaining amount of power for each of drivers expected to be a next day's driver, sets the standard target remaining amount of power as the target remaining amount of power,
changes the target remaining amount of power to a larger target remaining amount of power that is above the standard target remaining amount of power by a predetermined amount in a case where the predicted next charging day is postponed for one or more days by setting the larger target remaining amount of power, and
changes the target remaining amount of power to a smaller target remaining amount of power that is below the standard target remaining amount of power by a predetermined amount in a case where a next charging day predicted on the basis of the daily pattern is not brought forward even when the smaller target remaining amount of power is set.

7. The electric vehicle charge control system according to claim 3, wherein the charge determination unit sets a standard target remaining amount of power for each of drivers expected to be a next day's driver, sets the standard target remaining amount of power as the target remaining amount of power, and
changes the target remaining amount of power to a larger target remaining amount of power that is above the standard target remaining amount of power by a predetermined amount in a case where the predicted next charging day is postponed for one or more days by setting the larger target remaining amount of power.

8. The electric vehicle charge control system according to claim 3, wherein the charge determination unit sets a standard target remaining amount of power for each of drivers expected to be a next day's driver, sets the standard target remaining amount of power as the target remaining amount of power, and
changes the target remaining amount of power to a smaller target remaining amount of power that is below the standard target remaining amount of power by a predetermined amount in a case where a next charging day predicted on the basis of the daily pattern is not brought forward even when the smaller target remaining amount of power is set.

9. An electric vehicle charge control method comprising:
recording a usage of an electric vehicle including an amount of power consumption of the electric vehicle in each period as a period-by-period usage history;
predicting a future amount of power consumption of the electric vehicle from the period-by-period usage history;
determining whether charging of a battery in the electric vehicle is necessary on the basis of the predicted future amount of power consumption and a present remaining amount of power of the battery;
calculating a target remaining amount of power that is a level to which the battery is charged in a case where it is determined that charging of the battery is necessary; and
charging the battery on the basis of results of the determination of whether charging of the battery is necessary and the calculation of the target remaining amount of power which are performed by the charge determination unit.

* * * * *